(12) United States Patent
Gotoh et al.

(10) Patent No.: US 8,303,847 B2
(45) Date of Patent: *Nov. 6, 2012

(54) PHOSPHOR, MANUFACTURING METHOD OF PHOSPHOR SHEET AND PHOSPHOR, AND LIGHT EMITTING DEVICE USING THE PHOSPHOR

(75) Inventors: Masahiro Gotoh, Tokyo (JP); Kenji Sakane, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 567 days.

This patent is subject to a terminal disclaimer.

(21) Appl. No.: 12/310,844

(22) PCT Filed: Sep. 21, 2007

(86) PCT No.: PCT/JP2007/068342
§ 371 (c)(1),
(2), (4) Date: Apr. 20, 2009

(87) PCT Pub. No.: WO2008/041501
PCT Pub. Date: Apr. 10, 2008

(65) Prior Publication Data
US 2010/0001631 A1    Jan. 7, 2010

(30) Foreign Application Priority Data
Sep. 29, 2006  (JP) .................. 2006-269688

(51) Int. Cl.
*C09K 11/64* (2006.01)
*H01J 29/20* (2006.01)

(52) U.S. Cl. ........... 252/301.4 F; 252/301.6 F; 313/503; 313/486; 257/98

(58) Field of Classification Search ........... 252/301.4 F, 252/301.6 F; 313/503, 486; 257/98
See application file for complete search history.

(56) References Cited

U.S. PATENT DOCUMENTS

| | | | |
|---|---|---|---|
| 5,851,428 A | | 12/1998 | Matsuda et al. |
| 7,443,094 B2 * | | 10/2008 | Sakane et al. .................. 313/503 |
| 7,445,730 B2 * | | 11/2008 | Nagatomi et al. ...... 252/301.4 F |
| 8,048,338 B2 * | | 11/2011 | Nagatomi et al. ...... 252/301.4 F |
| 2005/0285506 A1 * | | 12/2005 | Sakuma et al. ................. 313/503 |
| 2006/0197439 A1 | | 9/2006 | Sakane et al. |
| 2006/0208260 A1 | | 9/2006 | Sakuma et al. |
| 2006/0220047 A1 * | | 10/2006 | Nagatomi et al. ............... 257/98 |
| 2006/0220520 A1 * | | 10/2006 | Sakane et al. ................. 313/487 |
| 2007/0248519 A1 | | 10/2007 | Mitomo et al. |
| 2009/0021141 A1 | | 1/2009 | Emoto et al. |
| 2009/0026915 A1 * | | 1/2009 | Nagatomi et al. ............. 313/503 |

FOREIGN PATENT DOCUMENTS

| | | |
|---|---|---|
| EP | 1 878 778 A1 | 1/2008 |
| JP | A-09-328681 | 12/1997 |
| JP | A-2003-096446 | 4/2003 |
| JP | 2006-052337 A | 2/2006 |
| JP | A-2006-045271 | 2/2006 |
| JP | A-2006-137902 | 6/2006 |
| JP | A-2006-257353 | 9/2006 |
| WO | WO 2006/093135 A1 | 9/2006 |
| WO | WO 2006/093298 A1 | 9/2006 |
| WO | WO 2006/106883 * | 10/2006 |

OTHER PUBLICATIONS

Supplemental Partial European Search Report issued in Application No. 07 80 7692; Dated Jul. 20, 2010.
Korean Office Action Application No. 10-2009-7008699 dated Apr. 29, 2011, (with English Translation).

* cited by examiner

*Primary Examiner* — Carol M Koslow
(74) *Attorney, Agent, or Firm* — Foley & Lardner LLP

(57) ABSTRACT

To provide a phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), with a change rate of a ratio of element B atoms to the total numbers of atoms being smaller by 10% or the change rate of oxygen atoms to the total numbers of atoms being smaller by 40% in a range from a particle surface up to depth 2000 nm, having a broad emission spectrum in a range of blue color, having a broad flat excitation band in a range of near ultraviolet/ultraviolet, and having excellent emission efficiency, emission intensity, and luminance.

18 Claims, 6 Drawing Sheets

PHOSPHOR, MANUFACTURING METHOD OF PHOSPHOR SHEET AND PHOSPHOR, AND LIGHT EMITTING DEVICE USING THE PHOSPHOR

TECHNICAL FIELD OF THE INVENTION

The present invention relates to a phosphor containing nitrogen used for a cathode-ray tube (CRT), a display such as a field emission display (FED) and a plasma display (PDP), and an illumination device such as a fluorescent lamp and a fluorescent display tube, and an illumination device such as a crystal liquid back light, a manufacturing method of a phosphor sheet and the phosphor, and also to a light emission device such as a white LED illumination device (simply called "a white LED illumination" hereafter) in which a semiconductor light emitting element (LED) and the phosphor are combined.

BACKGROUND OF THE INVENTION

At present, a discharge type fluorescent lamp and an incandescent bulb used as the illumination device involve problems that a harmful substance such as mercury is contained, and life span is short. However, in recent years, a high luminescence LED emitting light of near ultraviolet/ultraviolet to blue color has been developed in sequence, and the white LED illumination for the practical application of the next generation has been actively studied and developed, in which the white light is created by mixing the light of the near ultraviolet/ultraviolet to blue color generated from the LED and the light generated from the phosphor having an excitation band in a wavelength region thereof. When the white LED illumination is put to practical use, since efficiency of converting electric energy into light is improved, less heat is generated and it is constituted of the LED and a phosphor, the white LED has advantages of good life span without burn-out of a filament like a conventional incandescent bulb and the harmful substance such as mercury is not contained, and miniaturization of the illumination device is realized, thus realizing an ideal illumination device.

There is a system of white LED illumination for creating a white light by combining this high luminescence LED and the phosphor, called one chip type system, and in the one-chip type system, the white light having excellent color rendering properties can be obtained, compared to the multi-chip type system in which white color is created by using three primary color LED such as red LED, green LED, and blue LED of high luminescence. Further, cost reduction is realized by the one-chip type system. Therefore, the one-chip type system is focused as an illumination of the next generation.

For example, the white LED illumination of one chip type system is given, in which a high luminance blue LED and a phosphor excited by blue light emitted from this LED and emitting yellow light are combined, and for example, the high luminance blue LED using an InGaN-based material and a garnet-based yellow phosphor (Y, Gd)$_3$(Al, Ga)$_5$O$_{12}$:Ce (YAG:Ce), Tb$_3$Al$_5$O$_{12}$:Ce, Ca$_3$Sc$_2$Si$_3$O$_{12}$:Ce are combined. In this white LED illumination, complementary relation of blue and yellow of the light is utilized. Initially, although this white LED illumination has high luminance, light emission on the longer wavelength side of a visible light region, namely light emission of a red color component is insufficient, thus involving a problem of inferior color rendering properties, which is an important factor as illumination. However, in recent years, the phosphor having an emission peak wavelength in a range from yellow to red, with a broad peak in an emission spectrum, and the phosphor containing nitrogen having an excellent excitation band in a range from near ultraviolet/ultraviolet to blue color have been sequentially developed, and by adding these phosphors, the color rendering properties are improved. For example, Ca$_2$Si$_5$N$_8$:Eu, Sr$_2$Si$_5$N$_8$:Eu, Ba$_2$Si$_5$N$_8$:Eu, (Ca, Sr, Ba)$_2$Si$_5$N$_8$:Eu, Ca$_x$(Al, Si)$_{12}$(O, N)$_{16}$:Eu (0<x≦1.5), CaSi$_2$O$_2$N$_2$:Eu, SrSi$_2$O$_2$N$_2$:Eu, BaSi$_2$O$_2$N$_2$:Eu, (Ca, Sr, Ba)Si$_2$O$_2$N$_2$:Eu, CaAl$_2$Si$_4$N$_8$:Eu, CaSiN$_2$:Eu, CaAlSiN$_3$:Eu are typically given as examples of the phosphor containing nitrogen.

However, the white LED illumination, in which the high luminance blue LED and the garnet-based yellow phosphor are combined, has problems that the garnet-based yellow phosphor has no flat excitation band in the vicinity of the excitation band wavelength 460 nm, and there is a variation in emission intensity of the high luminance blue LED and the peak wavelength, and a balance of the emission intensity of blue and yellow is lost when the phosphor is applied on the LED because the emission intensity of transmitted blue light is changed depending on a film thickness, resulting in change of color tone of the white light.

In order to solve the above-described problem, study and examination on the white LED illumination system have been actively performed, in which white color is obtained, by utilizing mixing color of lights obtained from the LED emitting near ultraviolet/ultraviolet light, and the phosphor emitting red color (R), the phosphor emitting green color (G), and the phosphor emitting blue color (B), excited by the light of near ultraviolet/ultraviolet light emitted from this LED. This system is more excellent in color rendering properties, because an arbitrary emission color can be obtained in addition to white light, by combination and a mixing ratio of R, G, B, and the white emission is obtained by not the complementary relation of the light but by a mixing color relation, and by using R, G, B and other phosphor with broad emission spectrum, the emission spectrum close to sun light can be obtained compared with the illumination in which the high luminance blue LED and the garnet-based yellow phosphor are combined. Further, even when there is a variation in the emission intensity and the peak wavelength, as is seen in the high luminance blue LED, the near ultraviolet/ultraviolet ray is not utilized in mixing color of the light. Therefore, phenomenon such as changing the color tone of the white light is not allowed to occur, and the white LED illumination with excellent color rendering properties and no variation of color tones can be manufactured.

Then, as the phosphor used in this purpose of use, Y$_2$O$_2$S:Eu, La$_2$O$_2$S:Eu, 3.5MgO.0.5MgF$_2$.GeO$_2$:Mn, (La, Mn, Sn)$_2$O$_2$S.Ga$_2$O$_3$:Eu are given as examples of a red phosphor, and ZnS:Cu, Al, CaGa$_2$S$_4$:Eu, SrGa$_2$S$_4$:Eu, BaGa$_2$S$_4$:Eu, SrAl$_2$O$_4$:Eu, BAM:Eu, Mn, (Ba, Sr, Ca)$_2$SiO$_4$:Eu are given as examples of a green phosphor, and BAM:Eu, Sr$_5$(PO$_4$)$_3$Cl:Eu, ZnS:Ag, (Sr, Ca, Ba, Mg)$_{10}$(PO$_4$)$_6$Cl$_2$:Eu are given as examples of a blue phosphor.

The aforementioned Y$_2$O$_2$S:Eu, La$_2$O$_2$S:Eu, 3.5MgO.0.5MgF$_2$.GeO$_2$:Mn, (La, Mn, Sm)$_2$O$_2$S.Ga$_2$O$_3$:Eu, ZnS:Cu, Al, CaGa$_2$S$_4$:Eu, SrGa$_2$S$_4$:Eu, BaGa$_2$S$_4$:Eu, SrAl$_2$O$_4$:Eu, BAM:Eu, Mn, (Ba, Sr, Ca)$_2$SiO$_4$:Eu, and BAM:Eu, Sr$_5$(PO$_4$)$_3$Cl:Eu, ZnS:Ag, (Sr, Ca, Ba, Mg)$_{10}$(PO$_4$)$_6$Cl$_2$:Eu have a high efficient excitation band even in the near ultraviolet/ultraviolet region, with the emission spectrum having a broad peak. Therefore, the luminance and the color rendering properties are improved even in the white LED illumination in which the near ultraviolet/ultraviolet LED and R, G, B and other phosphors are combined. However, there is no high efficient and high luminance R, G, B and other phosphors such as a YAG:Ce phosphor used in a combination of the high luminance blue LED and the garnet-based yellow phosphor. Therefore, satisfactory white LED illumination can not be obtained.

Accordingly, a new phosphor having further excellent emission characteristics is developed, and regarding the blue phosphor also, a new blue phosphor exceeding the current BAM:Eu, $Sr_5(PO_4)_3Cl$:Eu, ZnS:Ag, $(Sr, Ca, Ba, Mg)_{10}(PO_4)_6 Cl_2$:Eu has been actively performed, and in recent years, $La_{1-x}Si_3N_5$:$Ce_x$ (for example, see patent document 1) is reported as the phosphor containing nitrogen.

Also, inventors of the present invention reports the phosphor having a broad emission spectrum in a range of blue color (in a peak wavelength range from 400 nm to 500 nm) and having a broad flat excitation band in a range of the near ultraviolet/ultraviolet, and having excellent emission efficiency and emission intensity/luminance (see patent document 2).

Patent document 1: Japanese Patent Laid Open Publication No. 2003-96446
Patent document 2: Japanese Patent application No. 2005-380323

DISCLOSURE OF THE INVENTION

Problem to be Solved by the Invention

However, although the phosphor of the aforementioned patent document 1 containing nitrogen is a blue phosphor with an emission spectrum having a broad peak, emission efficiency in a case of being excited by an excitation light of near ultraviolet/ultraviolet fails in meeting a satisfactory level, and a sufficient emission intensity and luminance can not be obtained. Therefore, this phosphor seems to be insufficient for being used in a light emission device.

In addition, although the phosphor of the patent document 2 proposed by the inventors of the present invention is the phosphor having excellent emission efficiency and emission intensity/luminance compared with a conventional phosphor, the luminance, being a most essential factor as illumination, fails in meeting a satisfactory level when the white LED illumination is manufactured in combination with the near ultraviolet/ultraviolet LED. Therefore, further improvement of the emission efficiency and emission intensity of the phosphor is required.

In view of the above-described problems, the present invention is provided, and an object of the present invention is to provide a new phosphor having a broad emission spectrum in a range of blue color (in a peak wavelength range from 400 nm to 500 nm), and having a broad flat excitation band in a range of the near ultraviolet/ultraviolet, and having excellent emission efficiency and emission intensity/luminance, and provide a manufacturing method of a phosphor sheet and the phosphor, and a light emission device including white LED illumination using this phosphor.

Means for Solving the Problem

In order to solve the above-described problem, various kinds of examinations are performed by the inventors of the present invention. Then in particles of the phosphor which is given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), the inventors of the present invention found a deviation in a distribution state of atoms of each element. Here, the inventors of the present invention takes notice of the distribution state of the atoms in the phosphor particles contrary to accepted knowledge, and so considers that suppression of the deviation contributes to improving the emission intensity of the phosphor.

According to a conventional accepted knowledge, a particle surface contributes to light emission in the phosphor, and inside of each particle is neglected.

When a phosphor particle sample suppressing the deviation is manufactured, and the emission intensity of this phosphor particle sample is measured, the inventors of the present invention find a significant increase of the emission intensity. Next, the inventors of the present invention proceeds with study on a manufacturing method capable of manufacturing phosphor particles suppressing the deviation, with high productivity, and find an industrially easy manufacturing method while maintaining high productivity, to achieve the present invention.

Namely, in order to solve the above-described problem, a first structure provides a phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency containing at least Si, O is oxygen, N is nitrogen, and element Z is one or more kind of activating agent, satisfying m>0, a>0, b>0, o≧0, and n>0), wherein when the ratio of element B atoms to total numbers of atoms in a depth of 50 nm from a particle surface is set at $M(B)_{50}$ at %, and the ratio of the element B atoms to the total numbers of atoms in a depth of dnm which is obtained by measuring a range of the depth from 50 nm to 1950 nm from the particle surface is set at $M(B)_d$ at %, a value of $M(B)_d$ obtained by measuring the range of the depth from 50 nm to 1950 nm from the particle surface at a prescribed interval satisfies:

$$-10<(M(B)_d-M(B)_{50})/M(B)_{50}\times 100<10.$$

A second structure provides a phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), wherein when the ratio of oxygen atoms to the total numbers of atoms in a depth of 50 nm from a particle surface is set at $M(O)_{50}$ at %, and the ratio of the oxygen atoms to the total numbers of atoms in a depth of dnm which is obtained by measuring a range of a depth from 50 nm to 1950 nm from the particle surface is set at $M(O)_d$ at %, a value of $M(O)_d$ obtained by measuring the range of the depth from 50 nm to 1950 nm from the particle surface satisfies:

$$-40<(M(O)_d-M(O)_{50})/M(O)_{50}\times 100<40.$$

A third structure provides a phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), wherein when the ratio of element B atoms to the total numbers of atoms and the ratio of oxygen atoms to the total numbers of atoms in a depth of 50 nm from a particle surface are respectively set at $M(B)_{50}$ at %, and $M(O)_{50}$ at %, and the ratio of the element B atoms to the total numbers of atoms in a depth of dnm which is obtained by measuring a range from depth 50 nm to 1950 nm from the particle surface at an interval of 100 nm is set at $M(B)_d$ at %, and the ratio of the oxygen atoms to the total numbers of atoms in a depth of dnm which is obtained by measuring a range from depth 50 nm to 1950 nm from the particle surface at an interval of 100 nm is set at $M(O)_d$ at %, values of $M(B)_d$ and $M(O)_d$ obtained by measuring the range of the depth from 50 nm to 1950 nm from the particle surface at a prescribed interval satisfy:

$-10<(M(B)_d-M(B)_{50})/M(B)_{50}\times 100<10$, and $-40<(M(O)_d-M(O)_{50})/M(O)_{50}\times 100<40$.

A fourth structure provides the phosphor according to any one of the first to third structures, satisfying: $5.0<(a+b)/m<9.0$, $0\leq a/m\leq 2.0$, $0\leq o<n$, $n=2/3m+a+4/3b-2/3o$, wherein a peak wavelength of an emission spectrum is in a range from 400 nm to 500 nm, under excitation of light in a wavelength range from 250 nm to 430 nm.

A fifth structure provides the phosphor according to any one of the first to fourth structures, satisfying $0\leq a/m\leq 2.0$, $4.0\leq b/m\leq 8.0$, $6.0\leq (a+b)/m\leq 8.0$, $0<o/m\leq 3.0$.

A sixth structure provides the phosphor according to any one of the first to fifth structures, satisfying $a=x\times m$, $b=(6-x)\times m$, $o=(1+x)\times m$, $n=(8-x)\times m$ when satisfying $0<x\leq 2$.

A seventh structure provides the phosphor according to any one of the first to sixth structures, wherein the element M is one or more kinds of elements selected from a group consisting of Mg, Ca, Sr, Ba, Zn, and rare earth elements having bivalent valency, the element A is one or more kinds of elements selected from a group consisting of B, Al, Ga, In, Ti, Y, Sc, P, As, Sb, and Bi, the element B is one or more kinds of elements selected from a group consisting of Si, Ge, Sn, Ti, Hf, Mo, W, Cr, Pb, Zr, and the element Z is one or more kinds of elements selected from a group consisting of rare earth elements and transitional metal elements.

An eighth structure provides the phosphor according to any one of the first to seventh structures, wherein the element M is one or more kinds of elements selected form the group consisting of Mg, Ca, Sr, Ba, and Zn, the element A is one or more kinds of elements selected from the group consisting of Al, Ga, and In, the element B is Si and/or Ge, and the element Z is one or more kinds of elements selected from the group consisting of Eu, Ce, Pr, Tb, Yb, and Mn.

A ninth structure provides the phosphor according to any one of the first to eighth structures, wherein the element M is Sr, the element A is Al, the element B is Si, and the element Z is Eu.

A tenth structure provides the phosphor according to any one of the first to ninth structures, wherein when the phosphor is given by a general composition formula expressed by $MmAaBbOoNn:Zz$, a value of $z/(m+z)$, being a molar ratio of the element M and the element Z, is 0.0001 or more and 0.5 or less.

An eleventh structure provides the phosphor according to any one of the first to tenth structures, wherein a primary particle of a particle size of 50 μm or less and an aggregate, in which primary particles are aggregated, are included, and an average particle size (D50) of phosphor powders including the primary particle and the aggregate of the primary particles is 1.0 μm or more and 50 μm or less.

A twelfth structure provides a manufacturing method of the phosphor according to any one of the first to eleventh structures, including the steps of:

weighing and mixing raw material powders of the phosphor to obtain a mixture;

firing the mixture in a firing furnace to obtain a fired material; and pulverizing the fired material to obtain a phosphor, wherein any one of inert gas such as nitrogen and rare gas, ammonia, mixed gas of the ammonia and the nitrogen, or the mixed gas of the nitrogen and hydrogen is used in the step of obtaining the fired material by firing the mixture.

A thirteenth structure provides the manufacturing method of the phosphor according to the twelfth structure, wherein gas containing 80% or more nitrogen gas is used as an atmosphere gas in the firing furnace.

A fourteenth structure provides the manufacturing method of the phosphor according to the twelfth or thirteenth structure, wherein firing of the mixture is performed twice, and pulverization mixture of the fired mixture is performed between firings in the step of obtaining the fired material by firing the mixture in the firing furnace.

A fifteenth structure provides the manufacturing method of the phosphor according to any one of the twelfth to fourteenth structures, wherein firing is performed while circulating 0.1 ml/min or more atmosphere gas in the firing furnace in the step of obtaining the fired material by firing the mixture in the firing furnace.

A sixteenth structure provides the manufacturing method of the phosphor according to any one of the twelfth to fifteenth structures, wherein inside of the firing furnace is set in a pressurizing state, with the atmosphere gas set at 0.001 MPa or more and 1.0 MPa or less in the step of obtaining the fired material by firing the mixture in the firing furnace.

A seventeenth structure provides the manufacturing method of the phosphor according to any one of the twelfth to sixteenth structures, wherein a crucible made of a nitride material is used as a firing crucible.

An eighteenth structure provides the manufacturing method of the phosphor according to the seventeenth structure, wherein firing is performed, by covering the crucible made of the nitride.

A nineteenth structure provides a phosphor sheet, wherein the phosphor according to any one of the first to eleventh structures is dispersed in resin or glass.

A twentieth structure provides a light emission device, having the phosphor according to any one of the first to eleventh structures or the phosphor sheet according to the nineteenth structure, and an light emission part for emitting light of a first wavelength, wherein a part or the whole part of the light of the first wavelength is set as an excitation light, so that the light of a different wavelength from the first wavelength is emitted from the phosphor.

A twenty-first structure provides the light emission device according to the twentieth structure, wherein the first wavelength is the wavelength of 250 nm to 430 nm.

A twenty-second structure provides the light emission device according to the twentieth structure or the twenty-first structure, wherein the light emission part emitting the first wavelength is an LED.

ADVANTAGE OF THE INVENTION

According to the phosphor of the first to third structures, there is less composition shift from a phosphor particle surface to inside. Therefore, the phosphor having high emission efficiency, with less crystal strain/crystal defect and less impurity phase can be provided.

According to the phosphor of the fourth to eleventh structures, it is possible to provide the phosphor having a high efficient excitation band in a range of near ultraviolet/ultraviolet, with an emission spectrum in a range of blue color (peak wavelength of 400 nm to 500 nm) under excitation of the light in the range from the near ultraviolet/ultraviolet, and having excellent emission efficiency and emission intensity/luminance.

According to the phosphor of the eleventh structure, the obtained phosphor is set in a powder state, and this makes it possible to easy pulverization and coating to various places as paste. In addition, an average particle size (D50) of this phosphor is 1.0 μm or more and 50.0 μm or less, and therefore coating density can be increased, and this makes it possible to obtain a high intensity and high luminance coating film.

According to a manufacturing method of the twelfth to eighteenth structures, the phosphor of the first to fourteenth structures can be easily manufactured at an inexpensive manufacturing cost.

According to a phosphor sheet of the nineteenth structure, various light emission devices can be easily manufactured by combining the phosphor sheet and various light emission devices.

According to a light emission device of the twentieth structure to the twenty-second structure, a high efficient light emission device with high emission intensity and high luminance having a desired emission color can be obtained.

BEST MODE FOR CARRYING OUT THE INVENTION

Preferred embodiments of the present invention will be described hereunder. However, the present invention is not limited thereto.

The phosphor of this embodiment is the phosphor having a matrix structure given by a general composition formula $MmAaBbOoNn:Z$. Here, the element M is one or more kinds of elements selected from the elements having bivalent valency in the phosphor. The element A is one or more kinds of elements selected from the elements having tervalent valency in the phosphor. The element B is one or more kinds of elements selected from the elements having tetravalent valency in the phosphor. The element O is oxygen. The element N is nitrogen. The element Z is the element that acts as an activating agent in the phosphor, and is one or more kinds of elements selected from rare earth elements and transitional metal elements, satisfying $m>0$, $a>0$, $b>0$, $o \geq 0$, $n>0$.

Further, change in the ratio of the element B atoms with respect to the total numbers of atoms is smaller by 10% in a range of a depth 2000 nm from a phosphor particle surface, and change in the ratio of the oxygen atoms with respect to the total numbers of atoms is smaller by 40%. Namely, when the ratio of the element B atoms to the total numbers of atoms in a depth of 50 nm from the particle surface is set at $M(B)_{50}$ at %, and the ratio of the element B atoms to the total numbers of atoms in a depth dnm, which is obtained by measuring the depth from 50 nm to 1950 nm from the particle surface at an interval of 100 nm, is set at $M(B)_d$ at %, a value of $M(B)_d$, which is obtained by measuring the range of the depth from 50 nm to 1950 nm from the particle surface, satisfies:

$-10 < (M(B)_d - M(B)_{50})/M(B)_{50} \times 100 < 10$.

In addition, when the ratio of the oxygen atoms to the total numbers of atoms in the depth of 50 nm from the particle surface is set at $M(O)_{50}$ at %, and the ratio of the oxygen atoms to the total numbers of atoms in the depth of dnm, which is obtained by measuring the range of the depth from 50 nm to 1950 nm from the particle surface at an interval of 100 nm, is set at $M(O)_d$ at %, the value of $M(O)_d$, which is obtained by measuring the range of the depth from 50 nm to 1950 nm from the particle surface, satisfies:

$-40 < (M(O)_d - M(O)_{50})/M(O)_{50} \times 100 < 40$. It is preferable to satisfy both the change rate of under 10% of the element B atoms in the range of the depth 2000 nm from the particle surface and the change rate of under 40% of the oxygen atoms. However, it is also preferable to satisfy either one of them.

Here, explanation will be simply given for a reason why the values of $M(B)_d$ and $M(O)_d$ are measured in the range of the depth 50 nm to 1950 nm from the particle surface.

Generally, not a small amount of oxygen and carbon are adsorbed on the surface of a substance, and therefore a large amount of oxygen and carbon is detected in the vicinity of the particle surface, and a relatively small amount of content of other atoms are detected in some cases. Further, in the metal not containing the oxygen and carbon also, the oxygen and carbon are detected in some cases in the vicinity of the surface, and ceramic powders having irregularities on the surface is affected thereby significantly, because adsorption amount of the oxygen and carbon on the surface is increased.

Therefore, in the aforementioned measurement, evaluation/comparison is performed in the range of the depth of 1950 nm, being almost 2000 nm, from the range of the depth 50 nm from the particle surface where reliability of measurement can be ensured.

The phosphor, with the change rate of the element B atoms to the total numbers of atoms is smaller than 10%, and the change rate of the oxygen atoms to the total numbers of atoms is smaller than 40%, has less unevenness in a distribution of the atoms extending from the particle surface to inside of the particle. Therefore, the composition shift is decreased, and the phosphor with less crystal defect/crystal strain, less impurity phase, and high emission efficiency can be provided. When the emission intensity is expressed by relative intensity, the emission intensity of the phosphor can be improved by about 30%, compared with the phosphor having unevenness in the distribution of the atoms extending from the particle surface to inside of the particle.

Further, in this phosphor, $(a+b)/m$ is in a range of $5.0<(a+b)/m<9.0$, $a/m$ is in a range of $0 \leq a/m \leq 2.0$, and a relation between the oxygen and nitrogen is expressed by $0 \leq o < n$, and the nitrogen is expressed by $n = 2/3\ m + a + 4/3b - 2/3o$.

The phosphor of this embodiment having the aforementioned characteristics has a high efficient excitation band in the range of the near infrared/infrared, showing the emission spectrum having a broad peak under excitation by a part or the whole part of the lights in the wavelength range from 250 nm to 430 nm, with a maximum peak wavelength in the range from 400 nm to 500 nm, from which high efficient light emission can be obtained. Therefore, by mixing this phosphor and the phosphor of other suitable color, and by combining this phosphor and the light emission part of the near ultraviolet/ultraviolet LED, etc, the high efficient light emission device with high intensity and high luminance having a desired emission color can be obtained.

Of course the phosphor of this embodiment has more excellent emission intensity and luminance, compared with an already reported phosphor $La_{1-x}Si_3N_5:Ce_x$ containing nitrogen (for example, see patent document 1), and also exhibits more emission characteristics even when compared with BAM:Eu, $Sr_5(PO_4)_3Cl:Eu$, ZnS:Ag, $(Sr,Ca,Ba,Mg)_{10}(PO_4)_6Cl_2:Eu$, and further high luminance white LED illumination can be manufactured.

In a case of the excitation band of currently used oxide phosphor BAM:Eu and halophosphate phosphor (Sr, Ca, Ba, Mg)$_{10}$(PO$_4$)$_6$Cl$_2$:Eu, the excitation band drastically drops on the longer wavelength side of the wavelength 380 nm or more, being the near infrared/infrared region. Meanwhile, since the phosphor of this embodiment contains the nitrogen, the ratio of a covalent bond is larger than the oxide phosphor, and the phosphor of this embodiment has a flat excellent excitation band up to the longer wavelength side, compared with the currently used oxide phosphor and halophsphate phosphor. Therefore, when the white LED illumination is manufactured in combination with the near infrared/infrared LED, variation of color tone of white light can be suppressed.

The phosphor of this embodiment has a high efficient excitation band in the range of the near infrared/infrared range, showing the emission spectrum with a broad peak, under excitation by the light in the wavelength range from 250 nm to 430 nm, with a maximum peak wavelength in a range from 400 nm to 500 nm, thus making it possible to obtain high efficient light emission. Although a detailed reason therefore is not clarified, it can be roughly considered as follows.

First, in the phosphor given by a general composition formula MmAaBbOoNn:Z according to this embodiment, by setting the values of m, a, b, o, n in the range of $5.0<(a+b)/m<9.0$, $0 \leq a/m \leq 2.0$, $0 \leq o<n$, $n=2/3\ m+a+4/3b-2/3o$, the activating agent, being a center of light emission, can exist regularly in a distance where no concentration quenching occurs, in a crystal structure taken by this phosphor, and by efficiently transmitting an excitation energy used in the light emission, which is given by the excitation light, the emission efficiency seems to be improved.

Further, when the aforementioned structure is taken, the phosphor has a chemically stable composition, and therefore an impurity phase not contributing to light emission is hardly generated in the phosphor, and decrease of the emission intensity seems to be suppressed. Namely, when a plurality of impurity phases are generated, the phosphor per unit area is reduced, and further high emission intensity can not be obtained, because the excitation light and the light generated from the phosphor are absorbed in the generated impurity phase.

Namely, when $(a+b)/n$ is in the range of $5.0<(a+b)/m<9.0$, and $a/m$ is in the range of $0 \leq a/m \leq 2.0$, generation of a phase emitting yellow to orange lights as the impurity phase is obviated, and weakening of the light intensity of blue color is obviated, and this is preferable. In addition, when the relation between the oxygen and nitrogen is expressed by $0 \leq o<n$, it is possible to avoid vitrification that occurs when a molar ratio of the oxygen becomes larger than the molar ratio of the nitrogen, and therefore decrease of the emission intensity due to impairing of crystallinity can be obviated, and this is preferable.

In addition, in the phosphor having the aforementioned general composition formula MmAaBbOoNn:Z, the element M has the bivalent balency, the element A has the tervalent balency, the oxygen has minus bivalent valency, and the nitrogen has minus tervalent valency. Therefore, when m, a, b, o, n has a relation of $n=2/3m+a+4/3b-2/3o$, the sum of the valency of each element becomes zero, to provide a stable phosphor, and this is preferable.

In the general composition formula MmAaBbOoNn:Z of the phosphor of this embodiment, the values of m, a, b, o, n are in the range of $5.0<(a+b)/m<9.0$, $0 \leq a/m \leq 2.0$, $0 \leq o<n$, $n=2/3\ m+a+4/3b-2/3o$, and are further preferably in the range of $4.0 \leq b/m \leq 8.0$, $6.0 \leq (a+b)/m \leq 8.0$, $0<o/m \leq 3.0$. This is because by setting optimal "a" and "o" within the aforementioned range by the values of m and b, generation of the impurity phase can be significantly suppressed, and deterioration of the crystallinity due to vitrification can be obviated. Further, when $a/m$ is set at 2.0 or less, structurally orderly and stable network can be assembled by the element A, the element B, the oxygen, and the nitrogen, and for example, when the element A is Al and the element B is Si, AlN, being a raw material, seems to be almost fully solved in a network with a shape of a tetrahedron composed of [SiN$_4$] or [(Al,Si)(O,N)$_4$], without being remained as an unreacted raw material. Further, by setting the values of a, b, o, n, at $a=x \times m$, $b=(6-x)'m$, $o\ (1+x) \times m$, $n=(8-x) \times m$, the element M has an ideal structure surrounded by a tetrahedron of [SiN$_4$] or [(Al,Si)(O,N)$_4$], and the emission efficiency as the phosphor is increased, and this is preferable. Here, x is in the range of $0<x \leq 2$, and is further preferably in the range of $0<x<1.5$.

Meanwhile, the element M is preferably one or more kinds of elements selected from the rare earth elements having bivalent valency, and further preferably the element selected from the group consisting of Mg, Ca, Sr, Ba, Zn, and most preferably Sr or Ba. Then, in any case, preferably Sr is contained in the element M.

The element A is preferably one or more kinds of elements selected from the group consisting of B, Al, Ga, In, Tl, Y, Sc, P, As, Sb, Di, and further preferably is one or more kinds of elements selected from the group consisting of Al, Ga, In, and most preferably is Al. Al is easily available and inexpensive, with small environmental load, in which AlN, being a nitride material is used as a general thermoelectric material and a structural material.

The element B is preferably one or more kinds of elements selected from the group consisting of Si, Ge, Sn, Ti, Hf, Mo, W, Cr, Pb, Zr, and further preferably is Si and/or Ge, and most preferably is Si. Si is easily available and inexpensive, in which Si$_3$N$_4$, being a nitride material, is used as a general thermoelectric material and a structural material.

The element Z is mixed in the form of replacing a part of the element M in the matrix structure of the phosphor, and is one or more kinds of elements selected from the rare earth elements or the transitional metal elements. From a viewpoint of exhibiting sufficient color rendering properties of each kind of light source including the white LED illumination using the phosphor of this embodiment, a half value width of a peak in the emission spectrum of the phosphor is preferably set wide. Then, the element Z is preferably one or more kinds of elements selected from the group consisting of Eu, Ce, Pr, Tb, Yb, and Mn from this viewpoint. Particularly when Eu is used as the element Z, Eu is preferable as the activating agent of each kind of light source including the white LED illumination, because this phosphor shows a broad emission spectrum of blue color with high emission intensity.

When the phosphor of this embodiment is given as a general composition formula MmAaBbOoNn:Z (satisfying $5.0<(a+b)/m<9.0$, $0 \leq a/m \leq 2.0$, $0 \leq o \leq n$, $n=2/3m+a+4/3b-2/3o$), an addition amount of the element Z is preferably in the range of 0.0001 or more and 0.50 or less, in the molar ratio $z/(m+z)$ of the element M and the element Z, being the activating agent. When the molar ratio $z/(m+z)$ of the element M and the element Z is within this range, and the deterioration of the emission efficiency, which is cause by the concentration quenching due to excessive content of the activating agent (element Z) occurs, can thereby be obviated. Meanwhile, it is also possible to obviate the deterioration of the emission efficiency because emission contributing atoms are insufficient due to too little content of the activating agent (element Z). Further, the value of the $z/(m+z)$ is preferably set in a range of 0.001 or more and 0.30 or less. However, an optimal value in the range of the value of the $z/(m++z)$ is slightly fluctuated depending on the kind of the activating agent (element Z) and the kind of the element M. Further, the peak wavelength of the light emission of the phosphor can be set so as to be shifted, by controlling the addition amount of the activating agent (element Z), and this is useful for adjusting the luminance and chromaticity in the obtained light source.

In addition, the peak wavelength of the light emission in the phosphor of this embodiment can be variable by selecting the element Z, and by activating a plurality of different kinds of elements Z, the peak wavelength can be variable and further the emission intensity and the luminance can be improved by a photosensitizing action.

As a result of performing a composition analysis result of the phosphor of this embodiment, a slight deviation is generated between the values of m, a, b, o, n of each element calculated from the composition analysis result, and the values of m, a, b, o, n calculated from the mixing ratio of the used raw materials. This is because extremely slight raw materials are decomposed and evaporated during firing, and further the deviation is caused by analysis error. Also, this is because the oxygen initially contained in the raw material and the oxygen adhered to the surface, the oxygen mixed due to oxidization of the surface of the raw material during weighing, mixing, and firing of the raw material, and further moisture and oxygen adsorbed on the surface of the phosphor after firing, are not considered particularly when o is calculated. Also, when the raw material is fired in an atmosphere containing nitrogen gas and/or ammonia gas, the oxygen in the raw material is slipped out during firing and replaced with nitrogen, thus allowing the slight deviation to occur in "o" and "n".

When the phosphor of this embodiment is used in the form of powders, a primary particle of a particle size of 50 μm or less and an aggregate, in which primary particles are aggregated, are included, and an average particle size of the primary particle and the phosphor powders including the aggregate is preferably set at 50 μm or less. This is because if the average particle size (note that the average particle size in this embodiment is a median diameter (D50).) is set at 50 μm or less, a surface area per unit weight of powder can be secured and the deterioration of the luminance can be obviated, because the light emission mainly occurs on the surface of the particle in the phosphor powders. Further, even when the powders can be formed into a paste and a light emitting element, etc, is coated with this paste, density of the powders can be increased, and from this viewpoint also, the deterioration of the luminance can be obviated. Also, according to an examination of the inventors of the present invention, although a detailed reason is not unknown, it is found that the average particle size is preferably set at 0.1 μm or greater, from the viewpoint of the emission efficiency of the phosphor powders. As described above, the average particle size of the phosphor powders of this embodiment is preferably set at 0.1 μm or more and 50 μm or less, and further preferably set at 5.0 μm or more and 30 μm or less. The average particle size (D50) specified here is a value measured by LS230 (a laser diffraction scattering method) by BECKMAN COULTER INC. From the aforementioned viewpoint, the value of a specific surface area (BET) of the phosphor powder of this embodiment is preferably set at 0.05 m$^2$/g or more and 5.00 m$^2$/g or less.

The phosphor of this embodiment has a peak of the emission spectrum in a range from 400 nm to 500 nm, showing a broad peak shape, and has excellent emission intensity and luminance, and therefore is suitable for a white LED illumination phosphor. Further, the phosphor of this embodiment has an excellent excitation band in the range of the near ultraviolet/ultraviolet, and therefore when the LED emitting near ultraviolet/ultraviolet light (in the vicinity of the wavelength range from 380 to 410 nm) proposed as the one-chip type white LED illumination, the phosphor emitting red (R) light, the phosphor emitting green (G) light, and the phosphor emitting blue (B) light, under excitation by the near ultraviolet/ultraviolet light emitted from the LED, are combined, and when this phosphor is used in the white LED illumination of a type obtaining white color by utilizing color mixing of the lights obtained from these R, G, B and other phosphors, this phosphor can be used, with approximately maximum emission intensity. Namely, by combining the light emission part emitting near ultraviolet/ultraviolet light and this phosphor, a white light source and white LED illumination with high output and high color rendering properties, and further an illumination unit using them can be obtained.

By combining the blue phosphor of this embodiment in a state of a powder shape, and a publicly-known green phosphor and red phosphor, a phosphor mixture containing the phosphor of this embodiment is manufactured, and by combining this phosphor mixture and the light emission part emitting light of a wavelength range from 250 nm to 450 nm and preferably a wavelength range from 350 nm to 430 nm, each kind of illumination device and mainly a backlight for a display device can be manufactured. The blue phosphor specified here emits light of a wavelength different from a first wavelength, with the light in the wavelength range from 250 nm to 450 nm set as the light of the first wavelength.

As a green phosphor to be combined, for example $SrAlSi_4N_7$:Ce, $Sr_2Al_2Si_{10}N_{14}$:Ce, (Ba, Sr, Ca)$Si_2O_2N_2$:Eu, ZuS:Cu, Al, ZnS:Cu, $SrAl_2O_4$:Eu, BAM:Eu, Mn, (Ba, Sr, Ca)$_2SiO_4$:Eu are given. However, the green phosphor is not limited thereto. Also, as a red phosphor to be combined, $CaAlSiN_3$:Eu, $Sr_2S$ is Na:Eu, (Ca, Sr)$_2Si_5N_8$:Eu, $3.5MgO.0.5MgF_2.GeO_2$:Mn, SrS:Eu, CaS:Eu, $Y_2O_2S$:Eu, $La_2O_2S$:Eu, (La, Mn, Sm)$_2O_2S.Ga_2O_3$:Eu are given. However, the red phosphor is not limited thereto.

An LED light emitting element emitting light in the range from the near ultraviolet to ultraviolet and a discharge lamp generating ultraviolet light, for example, can be used as the light emission part. For example, by combining the phosphor mixture containing the phosphor of this embodiment and the discharge lamp generating the ultraviolet light, a fluorescent lamp, an illumination unit, and a display device can be manufactured, and by combining the phosphor of this embodiment and an LED light emitting element emitting light of the near ultraviolet to ultraviolet, the illumination unit and the display device can be manufactured. Further, by combining the phosphor of this embodiment and a device generating electron beams also, the display device can be manufactured.

A method of combining the mixture of the phosphor and the light emission part of this embodiment may be performed by a publicly-known method. However, in a case of the light emission device using the LED in the light emission part, the light emission device can be manufactured as described below. The light emission device using the LED in the light emission part will be described hereunder, with reference to the drawings.

Figure 1:
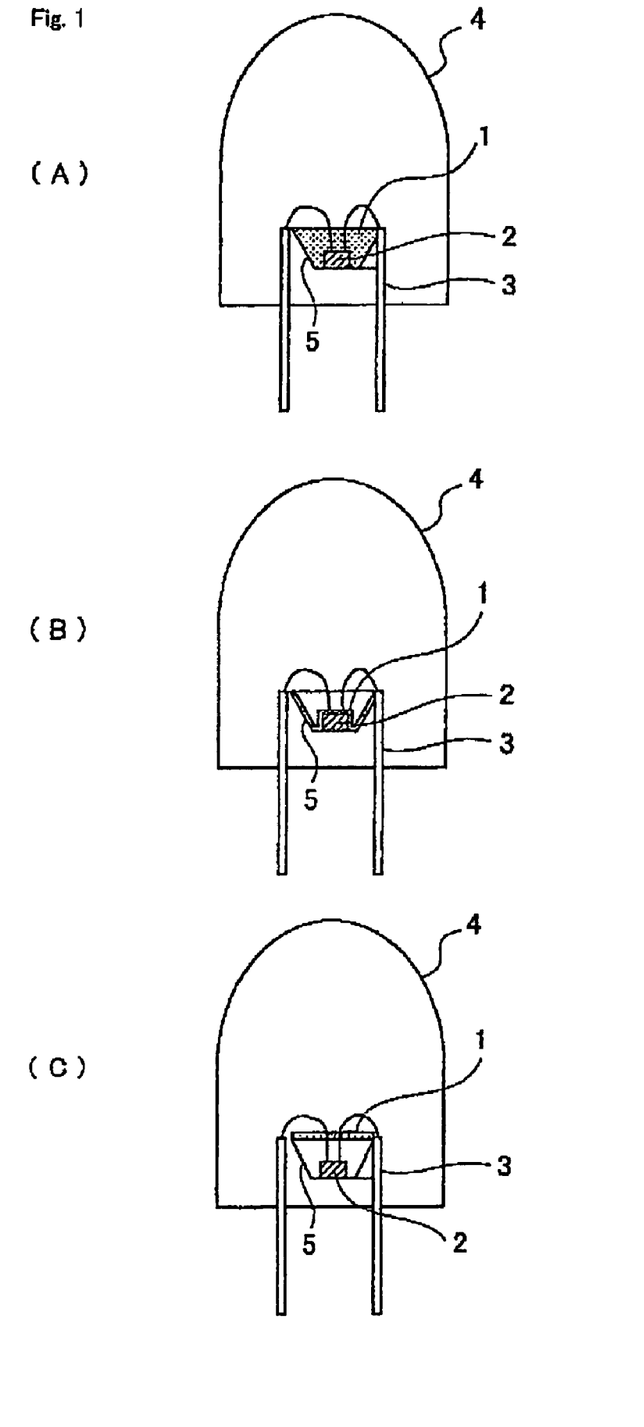
FIG. 1 is a schematic sectional view illustrating a bullet-type LED light emission device.

FIG. 1(A) to FIG. 1(C) are schematic sectional views of a bullet type LED light emission device, and FIG. 2(A) to FIG. 2(E) are schematic sectional views of a reflective type LED light emission device. Note that in each figure, the same signs and numerals are assigned to corresponding parts, and explanation therefore is omitted.

First, an example of the light emission device using the LED in the light emission part, with the LED combined with the phosphor mixture, will be described by using FIG. 1(A). In the bullet type LED light emission device, an LED light emitting element 2 is set in a cup-like container 5 provided on a tip end of a lead frame 3, in a state of being molded by a translucent resin 4. In this embodiment, all of the inside of the cup-like container 5 is embedded with the phosphor mixture or a mixture (described as a mixture 1) in which the phosphor mixture is dispersed in the translucent resin such as silicon-based resin or epoxy resin.

Preferably, a dispersant of light such as SiO$_2$ and Al$_2$O$_3$ may be contained in the resin.

Next, an example of a different light emission device will be described by using FIG. 1(B). In this embodiment, the upper surface of the cup-like container 5 and the upper surface of the LED light emitting element 2 are coated with the mixture 1.

Next, an example of a further different light emission device will be described by using FIG. 1(C). In this embodiment, the phosphor mixture 1 is set in an upper part of the LED light emitting element 2.

As described above, although the light from the LED light emitting element 2 is released in an upper direction, the bullet type LED light emission device described by using FIG. 1(A) to FIG. 1(C) can be manufactured in the same way even if the light is released in a lower direction. For example, the reflective type LED light emission device is constituted so that a reflection surface and a reflection plate are provided in a releasing direction of the light of this LED light emitting element 2, and the light released from this light emitting element 2 is reflected by the reflection surface and emitted to outside. Therefore, by using FIG. 2(A) to FIG. 2(E), explanation will be given for an example of the light emission device in which the reflective type LED light emission device and the phosphor mixture of this embodiment are combined.

Figure 2:
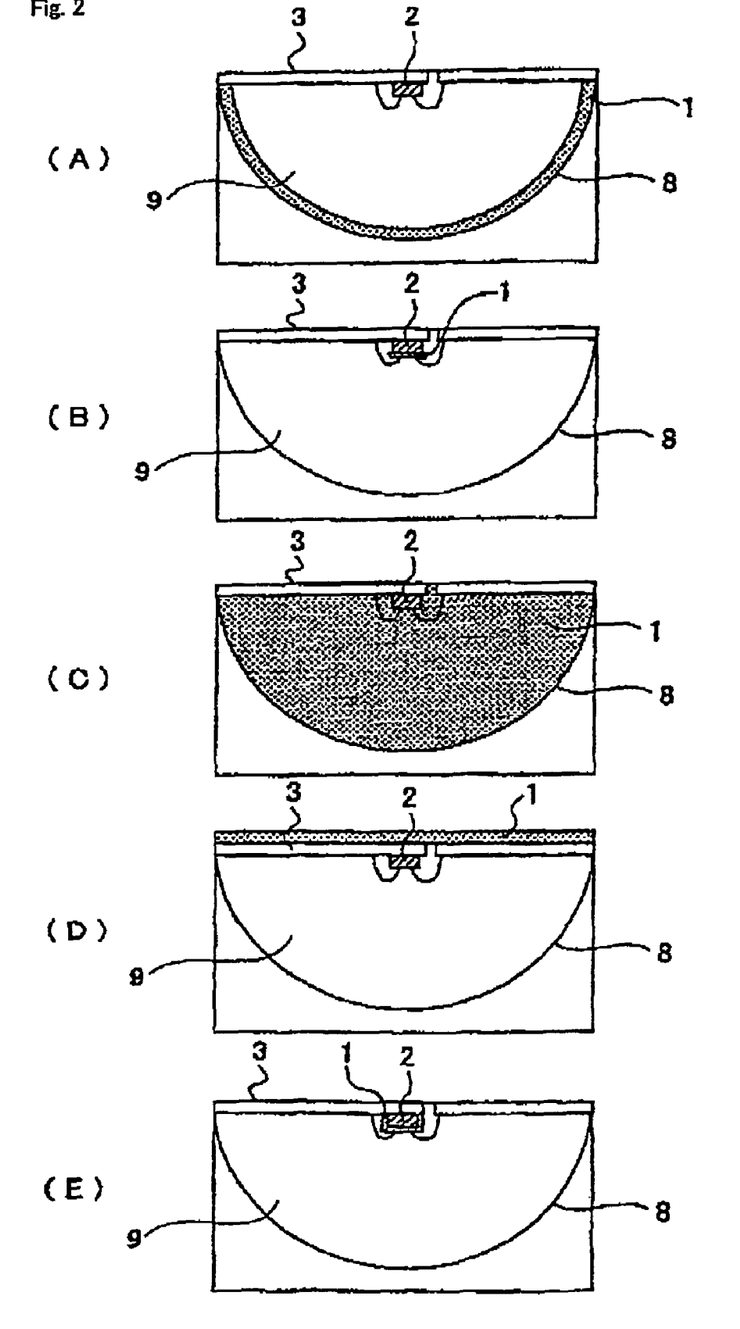
FIG. 2 is a schematic sectional view illustrating a reflective-type LED light emission device.

First, explanation will be given for an example of the light emission device in which the reflective type LED light emission device used in the light emission part, and the phosphor mixture of this embodiment are combined. In the reflective type LED light emission device, the LED light emitting element 2 is set on the tip end of the one of the lead frames 3, and light emission from this LED light emitting element 2 is performed by reflecting light by a reflection surface 8 to lower side and releasing this light from an upper part. In this embodiment, the upper surface of the reflection surface 8 is coated with the mixture 1. Note that inside of a recess portion formed by the reflection surface 8 is sometimes filled with a transparent mold material 9 for protecting the LED light emitting element 2.

Next, an example of a different light emission device will be described by using FIG. 2(B). In this embodiment, the mixture 1 is set in a lower part of the LED light emitting element 2.

Next, an example of the different light emission device will be described, by using FIG. 2(C). In this embodiment, the inside of the recess portion formed by the reflection surface 8 is filled with the mixture 1.

Next, an example of the different light emission device will be described by using FIG. 2(D). In this embodiment, the upper part of the transparent mold material 9 is coated with the mixture 1, for protecting the LED light emitting element 2.

Next, an example of a different light emission device will be described by using FIG. 2(E). In this embodiment, the surface of the LED light emitting element 2 is coated with the mixture 1.

The bullet type LED light emission device and the reflective type LED light emission device may be properly selectively used according to the purpose of use. However, the reflective type light emission device has a merit such as reducing its thickness, increasing a light emission area, and enhancing the use efficiency of light.

When the light emission device as described above is used as a high color rendering illumination light source, the light emission device must have an emission spectrum with excellent color rendering properties. Therefore, the color rendering properties of the light emission device incorporating the phosphor mixture containing the phosphor of this embodiment was evaluated by using an evaluation method of JISZ8726. In the evaluation of the JISZ8726, when a general color rendering index Ra of this light source is 80 or more, it can be said that this light emission device is an excellent light emission device. Then, preferably when a special color rendering index R15, being an index showing a component of a flesh color of a Japanese woman is 80 or more, it can be said that this light emission device is a significantly excellent light emission device. However, the aforementioned index may not be satisfied, depending on the purpose of use not requiring the color rendering properties and a different purpose.

Therefore, the light emission device was manufactured, in which the light from the light emission part emitting light in the wavelength range from 250 nm to 430 nm was emitted to the phosphor mixture containing the phosphor of this embodiment and the light was emitted from this phosphor mixture. Note that the ultraviolet LED emitting light with the wavelength of 405 nm was used as the light emission part. As a result, by mixing the phosphor of this embodiment, the light emission device having excellent color rendering properties with R15 set at 80 or more and R9 set at 60 or more can be obtained, when the correlated color temperature is set in a range from 10000K to 2500K. Namely, it was found that this light emission device was a light source having high luminance and having significantly excellent color rendering properties.

Meanwhile, it is also preferable to form into a phosphor sheet, with the phosphor mixture of this embodiment dispersed in the resin.

Each kind of the resin including the epoxy resin and the silicon-base resin the silicon-based resin, or glass, etc., can be considered as a material to become a medium used for manufacturing the phosphor sheet. As a use example of the phosphor sheet, it is also possible to perform prescribed light emission, by combining this phosphor sheet and the light source (light emission part) that performs suitable light emission. Note that as the excitation light for exciting this phosphor sheet, the light in the wavelength range from 250 nm to 430 nm may be preferable, and the light emitting element such as LED, an ultraviolet ray light source by Hg discharge and a light source by laser beams may be preferable.

Next, regarding the manufacturing method of the phosphor in this embodiment, an example of the manufacture of SrAl$_x$Si$_{6-x}$O$_{1+x}$N$_{8-x}$:Eu (however, x=0.8, Eu/(Sr+Eu)=0.030) will be described.

Note that the mixing composition of the raw materials and the composition generated after firing are different from each other, because of evaporation during firing of the phosphor raw materials. Particularly, in the firing at 1700° C. or more and in the firing for a long time, Si$_3$N$_4$ is gradually decomposed by this firing, and therefore it is preferable to mix the raw materials in larger amount than a target molar ratio. However, it is preferable to adjust a mixing amount by each firing condition, because an amount of decomposition is changed by the condition at the time of firing. Therefore, in the description hereunder, a composition formula calculated by a mixing ratio of the phosphor raw materials is shown for the convenience. Accordingly, the manufacturing method will be described in this embodiment, with the phosphor given by the composition formula $SrAl_{0.9}Si_{6.0}O_{1.25}N_{8.73}$ at the time of mixing the raw materials. Here, the same meaning is shown by z/(m+z) and Eu/(Sr+Eu). An amount of oxygen contained in the raw materials of the element of the activating agent at the time of mixing is small and is ignored.

Generally, a lot of phosphors are manufactured by a solid phase reaction, and the manufacturing method of the phosphor of this embodiment can be obtained by the solid phase reaction. However, the manufacturing method is not limited thereto. Each raw material of the element M, the element A, the element B may be a commercially available raw material such as nitride, oxide, carbonate, hydroxide, and basic carbonate. However, higher purity is preferable, and a material having 2N or more is preferable, or more preferably a material having 3N or more is prepared. As for the particle size of respective raw material particles, finer particles are generally more preferable from the view point of promoting reaction, but the particle sizes and shapes of obtained phosphors are changed according to the particle sizes and shapes of the raw materials. Therefore, nitride raw materials having approximate particle sizes fitted to particle size required for the phosphor obtained finally may be prepared. Preferably, the raw material having the particle size of 50 μm or less and further preferably the raw material having the particle size of 0.1 μm or more and 10.0 μm or less is used. The raw material of the element Z is preferably the commercially available nitride, oxide, carbonate, hydroxide, basic carbonate, or simple metal. Of course, the purity of each raw material is preferably higher, and the material having 2N or more is preferable, or more preferably the material having 3N or more is prepared. Particularly, when the carbonate is used as the raw material of the element M, a flux effect can be obtained without adding a compound composed of an element not contained in constituent elements of the phosphor of this embodiment as flux (reaction accelerator), and this is preferable.

In a case of a manufacture of the phosphor given by a composition formula $SrAl_{0.8}Si_{5.2}O_{1.8}N_{7.2}$:Eu, reduction of the raw material composition during firing is considered and a mixing composition is decided, so that the molar ratio of each element after firing is Sr:Al:Si:O:Eu=0.970:0.8:5.2:1.8:0.030. Here, the phosphor was manufactured, with the mixing composition formula set at $SrAl_{0.9}Si_{6.0}O_{1.25}N_{8.73}$:Eu (however, Eu/(Sr+Eu)=0.030). Preferably, as the raw material of each element, for example, as the raw materials of the element M, the element A, and the element B, $SrCO_3$(3N), $Al_2O_3$(3N), AlN(3N), $Si_3N_4$(3N) are prepared respectively, and as the element Z, $Eu_2O_3$(3N) is prepared. These raw materials are weighed and mixed, with $SrCO_3$ set at 0.970 mol, $Al_2O_3$ set at 0.25/3 mol, AlN set at (0.9−0.25/3×2) mol, $Si_3N_4$ set at 6.0/3 mol, $Eu_2O_3$ set at 0.030/2 mol. The carbonate is used as the Sr raw material, and this is because when the raw material of a low melting point such as the carbonate is used, the raw material itself acts as the flux, thus accelerating a reaction and improving emission characteristics, while an oxide raw material has a higher melting point and the flux effect can not be expected.

Also, when the oxide is used as the raw material, another substance may be added as the flux, to obtain the flux effect. However, in this case, the flux becomes impurity and it must be noted that there is a possibility that the characteristics of the phosphor are deteriorated by the impurity. The aforementioned weighing and mixing may be performed in an atmospheric air. However, the nitride of each raw material element is liable to be affected by moisture, and therefore it is convenient to operate in a glove box under an inactive atmosphere from which the moisture is sufficiently removed. Although a mixing system may be either case of a wet-type and a dry-type, a suitable organic solvent or liquid nitrogen must be selected, because the raw material is decomposed when water is used as the solvent of a wet-type mixing. An apparatus may be a normal one using a ball mill and a mortar.

The raw material thus completed in mixing was put in a crucible, and retained and fired at 1600° C. or more, preferably 1700° C. or more and 2000° C. or less for 30 minutes while circulating an atmosphere gas in the firing furnace. It a firing temperature is 1600° C. or more, the solid phase reaction is excellently advanced and the phosphor having excellent emission characteristics can be obtained. Moreover, if the firing temperature is set at 2000° C. or less, excessive sintering and melting can be prevented from occurring. Note that higher firing temperature allows the solid-phase reaction to be rapidly advanced, and a retaining time can thereby be shortened. Meanwhile, even when the firing temperature is low, a target emission characteristic can be obtained by keeping the temperature for a long time. However, longer firing temperature allows a particle growth to be advanced, and a particle form becomes large. Therefore, the firing time may be set in accordance with a target particle size.

The atmosphere gas flowing into the firing furnace is not limited to nitrogen, and preferably any one of the inert gas such as rare gas, ammonia, mixed gas of the ammonia and nitrogen, or the mixed gas of the nitrogen and hydrogen is used. However, when the oxygen is contained in the atmosphere gas, oxidation reaction of the phosphor particles occurs. Therefore, the oxygen content in the atmosphere gas as impurity is made small as much as possible, and for example is preferably set at 100 ppm or less. Further, when the moisture is contained in the atmosphere gas, the oxidation reaction of the phosphor particles occurs during firing, in the same way as the oxygen. Therefore, moisture content as impurity is made small as much as possible, and for example is preferably set at 100 ppm or less. Here, when a single gas is used as the atmosphere gas, nitrogen gas is preferable. Although firing by a single use of the ammonia gas is possible, higher cost is required for the ammonia gas compared with the nitrogen gas, and also the ammonia gas is a corrosive gas. Therefore, a specific procedure is required for the apparatus and an exhaust method at the time of a low temperature. Accordingly, when the ammonia is used, it is preferable to use the ammonia by reducing its concentration to low, for example in the form of the mixed gas with the nitrogen. For example, when the mixed gas of the nitrogen gas and the ammonia is used, 80% or more nitrogen and 20% or less ammonia are preferably mixed. Also, in a case of using the mixed gas of the nitrogen and other gas, a partial pressure of the nitrogen in the atmosphere gas is low, when a gas concentration excluding the nitrogen is higher. Therefore, from the viewpoint of accelerating a nitride reaction of the phosphor, inactive or reductive gas containing 80% or more nitrogen is preferably used.

In this embodiment, preferably the firing step under the aforementioned condition is repeated at least twice, and further a sample is taken out from a firing furnace between the firing steps, and pulverization/mixing operation is added to the sample. By repeating the firing, uniformity of a fired material is improved, and the emission efficiency of the phosphor is improved. In the pulverizing/mixing operation, a publicly-known method using the mortar, ball-mill, beads-mill, and jet-mill, etc, may be used.

Further it is preferable to provide a state of circulating 0.1 ml/min or more aforementioned atmosphere gas during firing. This is because although gas is generated from the raw materials during firing of the phosphor raw materials, it is possible to prevent an influence of the gas on the reaction due to the atmosphere inside of the furnace filled with the gas, and as a result, it is possible to prevent deterioration of the emission characteristics of the phosphor, by flowing an atmosphere containing one or more kinds of the gas selected from the mixed gas of the inert gas such as the aforementioned nitrogen and rare gas, ammonia, and the mixed gas of the ammonia and the nitrogen, or the mixed gas of the nitrogen and hydrogen. Particularly, when the raw material of decomposing the oxide material at high temperature such as the carbonate, hydroxide, and basic carbonate, etc, is used as the phosphor raw material, a generation amount of the gas is increased. Therefore, preferably the gas is circulated through the firing furnace and the generated gas is exhausted.

Meanwhile, in the step of firing the phosphor raw materials in the manufacture of the phosphor, the pressure in the firing furnace is preferably set in a pressurizing state so that the oxygen during the atmospheric air is not mixed into the furnace. However, if this pressure exceeds 1.0 MPa (in this embodiment, in-furnace pressure means a pressurized portion from the atmospheric pressure), a special pressure withstanding design is required in designing a furnace facility. Therefore, the pressure is preferably set at 1.0 MPa or less in consideration of productivity. In addition, when the pressure is increased, sintering between phosphor particles is excessively progressed, and pulverization after firing becomes difficult. Accordingly, from this viewpoint also, the in-furnace pressure during firing is set at 1.0 MPa or less, and further preferably set at 0.001 MPa or more and 0.1 MPa or less.

Note that an $Al_2O_3$ crucible, an $Si_3N_4$ crucible, an AlN crucible, a sialon crucible, a C (carbon) crucible, and a BN (boron nitride) crucible that can be used in the aforementioned gas atmosphere may be used as the crucible. However, if the crucible made of nitride material such as the BN crucible is used, mixing of the impurities from the crucible can be avoided and this is preferable.

In addition, when the firing is performed with the crucible covered with a lid during firing, preferably it is possible to prevent the deviation of the distribution of atoms from the surface inside of the phosphor particle, and decrease of the emission intensity can be suppressed. This is because by covering the crucible, separation of Si atoms and oxygen atoms from the surface of the particle is suppressed, and diffusion of the Si atoms and the oxygen atoms from inside of the particle to the surface of the particle is prevented. In the phosphor thus fired, the deviation of the distribution of atoms inside of the particles is suppressed. Then, as a result of suppressing the deviation of the distribution of atoms inside of the particle, the deviation of the composition inside of the particle is also suppressed, and the phosphor with less crystal defect/crystal strain, less impurity phase, and high emission efficiency can be obtained.

As a method of covering the crucible, an upper opening part of the crucible may be covered with a plate-like lid, or a container having a shape one size larger than the crucible may be turned upside down to cover the crucible as a lid. As a lid of the crucible, the lid made of a material that can be used in the aforementioned gas atmosphere such as $Al_2O_3$, $Si_3N_4$, AlN, sialon, C (carbon), BN (boron nitride) may be used. However, when the lid made of BN is particularly used, preferably the mixing of the impurities from the lid can be avoided. Note that the one size larger shape means specifically the container having an inner dimension of approximately the same dimension as an outer dimension of the crucible, to about twice the outer dimension of the crucible. The same thing can be said for a tray as will be described later.

Figure 5:
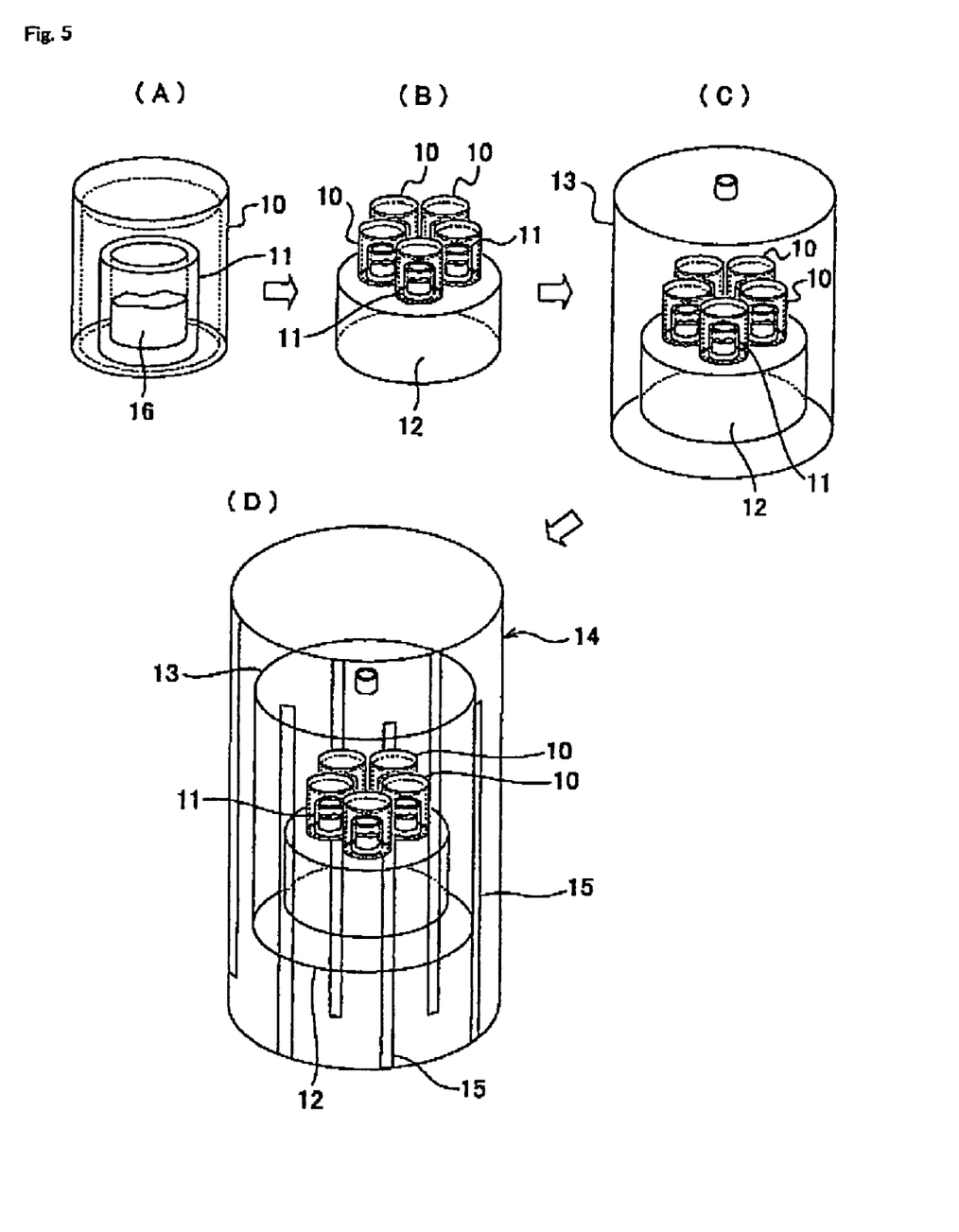
FIG. 5 is a perspective view illustrating a procedure of containing a crucible in a container that functions as a lid, and setting the crucible and the container in a firing furnace.

FIG. 5 illustrates an example of the container as a lid covering the crucible. As shown in FIG. 5(A), a container 10 is formed into a bottomed cylindrical shape having a dimension one size larger than that of a bottomed cylindrical shaped crucible 11, and is turned upside down with respect to the crucible 11, so as to contain the inside of the crucible 11 and cover the crucible 11. When the crucible 11 is set in a firing furnace 14, as shown in FIG. 5(B), one or a plurality of crucibles 11, in which a mixture 16 of the phosphor raw materials is contained, are arranged first on a carbon base 12, and each crucible 11 is covered with the container 10. Next, as shown in FIG. 5(C) and FIG. 5(D), these crucibles 11 and the container 10 are accommodated in a carbon container 13 together with the carbon base 12, and are placed in the firing furnace 14. The carbon container 13 uniformizes the heat from a plurality of carbon heaters 15 arranged in the firing furnace 14 in a peripheral direction, and also functions as a lid for the crucible 11, in the same way as the container 10.

Figure 6:
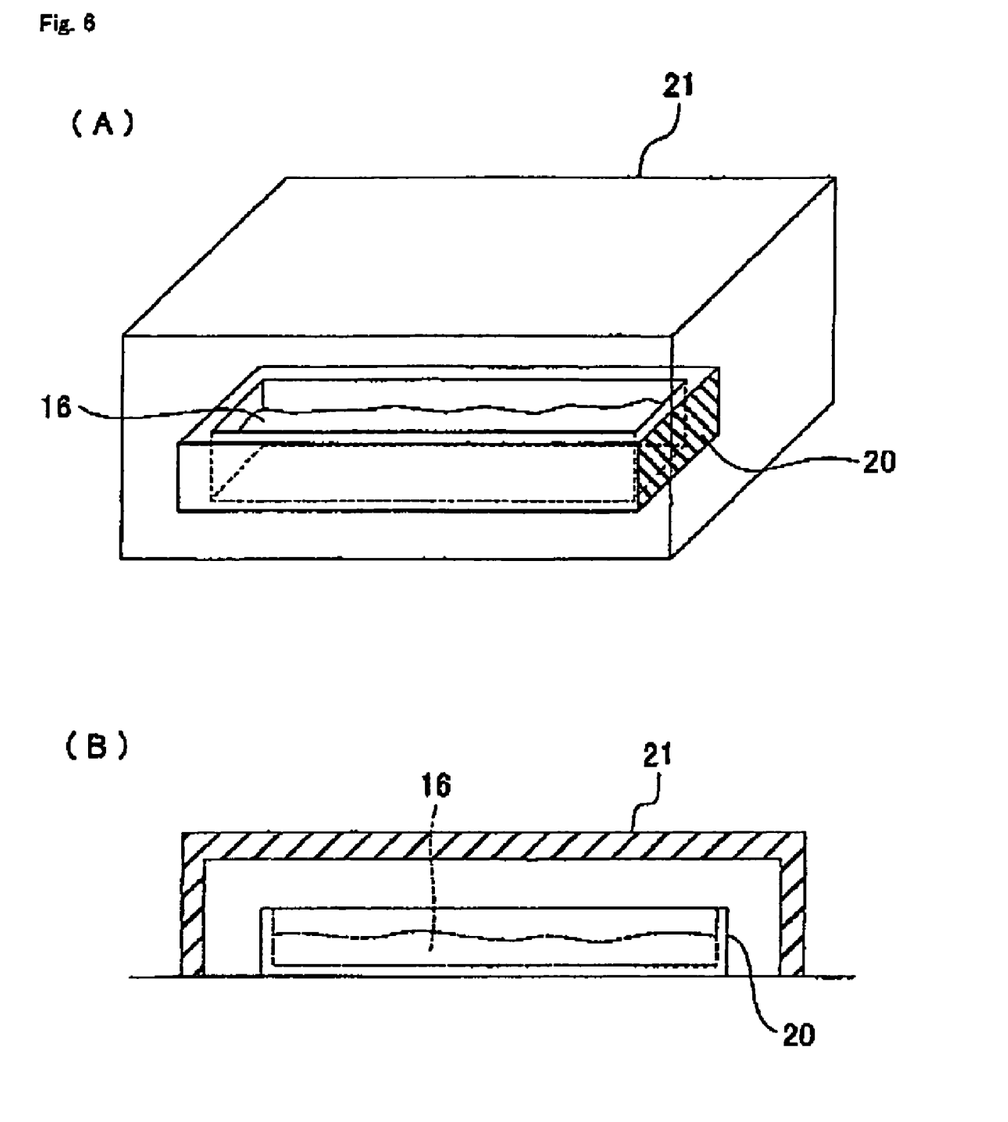
FIG. 6 illustrates a tray containing a mixture of phosphor raw materials together with a container that functions as a lid.

Other example of the lid is shown in FIG. 6. In this FIG. 6, the mixture 16 of the phosphor raw materials is contained in a box-shaped tray 20, with upper side opened. The tray 20 is made of the same material as the crucible 11, such as the BN (boron nitride). The lid of the tray 20 may be formed into a plate-like shape for covering an upper opening part of the tray 20. However, as shown in FIG. 6, it is also possible to use a box-shaped container 21 having one size larger shape, with a lower side opened, and the tray 20 may be covered with this container 21 so that the tray 20 can be accommodated in this container 21.

After completion of firing, the fired material is taken out from the crucible, and pulverizing means such as the mortar and the ball mill is used to pulverize the raw materials to a predetermined average size, and the phosphor of the composition expressed by $SrAl_{0.8}Si_{5.2}O_{1.8}N_{7.2}$:Eu can be manufactured. The phosphor thus obtained is then subjected to cleaning, classifying, surface treatment, and heat treatment as needed. The cleaning in an acid solution using fluorinated acid, hydrochloric acid, sulfuric acid, and nitric acid is preferable as a cleaning method, because metal atoms such as Fe adhered to the surface of the particle and un-reacted remained raw material particles are dissolved. Here, the amount of Fe, Ni, Co contained in the obtained phosphor is preferably set at 100 ppm or less.

When other element is used as the element M, the element A, the element B, and the element Z, and when an activating amount of the element Z, being the activating agent, is changed, the phosphor can be manufactured by the same manufacturing method as the aforementioned method, by adjusting the mixing amount of each raw material at the time of mixing, to a prescribed composition ratio. However, evaporation and sublimation, etc, of the raw materials occur during firing, and therefore the mixing/firing of the raw materials is performed, in consideration of the mixing ratio of the raw materials of this evaporating/sublimating portion.

EXAMPLES

The present invention will be more specifically described hereunder, based on examples.

Example 1

A sample according to an example 1 was manufactured by the following procedure. $SrCO_3$(3N), $Al_2O_3$(3N), AlN(3N), $Si_3N_4$(3N), and $Eu_2O_3$(3N) were prepared, and 0.950 mol of $SrCO_3$, 0.25/3 mol of $Al_2O_3$, (0.9−0.25/3×2) mol of AlN, 2 mol of $Si_3N_4$, and 0.050/2 mol of $Eu_2O_3$ were weighed and mixed by using the mortar in the atmospheric air, so that the molar ratio of each element becomes Sr:Al:Si:Eu=0.950:0.9:6.0:0.050. The mixed raw materials were put in the BN crucible, and were set in the furnace, with an upper side of the crucible covered with the container made of BN, which was one size larger than the BN crucible, as a lid. Then, after the inside of the furnace was vacuumized and replaced with nitrogen, the temperature was increased to 1600° C. at 15° C./min, and the raw materials were retained and fired for 3 hours at 1600° C., under the in-furnace pressure of 0.05 MPa in the circulating nitrogen atmosphere (in a flow state set at 20.0 L/min). Thereafter, the temperature was cooled from 1600° C. to 50° C. for 1 hour and 30 minutes, and the fired sample was taken out once and pulverized/mixed in the mortar. Then, the fired sample was put in the BN crucible again, and the container made of BN one size larger than the BN crucible was set in the furnace in a state of covering an upper part of the crucible as a lid, and after vacuumizing the inside of the furnace to replace the atmosphere with nitrogen, the temperature was increased to 1800° C. at 15° C./min under the in-furnace pressure of 0.05 MPa in the circulating nitrogen atmosphere (in the flow state set at 20.0 L/min), and the raw materials were retained and fired at 1800° C. for 3 hours. Thereafter, the temperature was cooled from 1800° C. to 50° C. for 1 hour and 30 minutes, and the firing was completed. Then, the fired sample was pulverized by using the mortar up to a suitable particle size in the atmospheric air, and the phosphor sample of the example 1 was obtained.

A result of a composition analysis of the obtained phosphor sample is shown in table 1. As the result of the composition analysis, it was found that the composition was close to the composition of the phosphor expressed by $SrAl_{0.8}Si_{5.2}O_{1.8}N_{7.2}$:Eu, which is the case of x=0.8 in the composition formula $SrAl_xSi_{6-x}O_{1+x}N_{8-x}$:Eu. However, this was a result of slightly less oxygen and more nitrogen than the molar ratio of each element in the composition formula. This is because the oxygen is easily separated from the sample because the raw materials were fired at a high temperature in the nitrogen atmosphere, and this is because the composition is influenced by slight error included in the result of the composition analysis. Therefore, it was possible to obtain the phosphor approximately close to the phosphor expressed by $SrAl_{0.8}Si_{5.2}O_{1.8}N_{7.2}$:Eu in the case of x=0.8 in the composition formula $SrAl_xSi_{6-x}O_{1+x}N_{8-x}$:Eu, although this was not the phosphor same as the phosphor expressed by $SrAl_xSi_{6-x}O_{1+x}N_{8-x}$:Eu.

The obtained phosphor sample was irradiated with a monochromatic light of 405 nm, and the emission intensity was measured. However, the emission intensity is shown by relative intensity, which is a value standardized, with the emission intensity of the phosphor in a comparative example 1 as will be described later set at 100%. This measurement result is shown in table 2.

TABLE 1

| | Sr (wt %) | Al (wt %) | Si (wt %) | O (wt %) | N (wt %) | Eu (wt %) |
|---|---|---|---|---|---|---|
| Example 1 | 21.1 | 5.6 | 37.5 | 6.6 | 27.4 | 1.8 |
| Comparative Example 1 | 20.2 | 5.0 | 34.0 | 4.3 | 35.4 | 1.8 |

TABLE 2

| | Relative emission intensity (%) | Peak wavelength (nm) |
|---|---|---|
| Example 1 | 132.2 | 451.6 |
| Comparative Example 1 | 100.0 | 457.1 |

Regarding the obtained phosphor, in order to examine the distribution state of atoms in the particles, the change rate of the Si atoms and the oxygen atoms, with respect to the total numbers of atoms from the surface of the particle toward depth of the particle, was examined by ESCA. Here, the measurement method of the ESCA will be described.

A measurement sample was set in a sample holder, and measurement was performed by "5800" produced by ULVAC.PHI, Inc. Measurement conditions are shown hereunder.

Used measurement apparatus: "5800" produced by ULVAC.PHI, Inc.
X-ray source: Al anode line source, 150W
Analysis area: 800 μmφ
Neutralizing gun: Used
Sample adjustment: Set on sample holder
Extraction angle: 45°
Ar sputter etching speed: 10 nm/min(SiO$_2$ corresponding value)

The measurement was performed from the surface of the particle to a position of depth 1950 nm from the position of depth 50 nm, at a depth interval of 100 nm, and the ratio of each atom to the total numbers of atoms (at %) was measured at each depth position.

The ratio of the Si atoms to the total numbers of atoms at each depth position is shown in table 3. In addition, the ratio of the Si atoms to the total numbers of atoms at a position of depth 50 nm is expressed by $M(Si)_d$, and the ratio of the Si atoms at a position of depth dnm from the surface of the particle is expressed by $M(Si)_d$, and the change rate (($M(Si)_d-M(Si)_{50})/M(Si)_{50}\times100$) was calculated and a result thereof was shown in table 3. Further, in FIG. 3, the change rate (($M(Si)_d-M(Si)_{50})/M(Si)_{50}\times100$) of the ratio of the Si atoms at each depth position was plotted by using ♦.

Also, the ratio of the oxygen atoms at each depth position with respect to the total numbers of atoms is shown in table 4. Also, the ratio of the oxygen atoms at the position of depth 50 nm is expressed by $M(O)_{50}$, and the ratio of the oxygen atoms at the position of depth dnm is expressed by $M(O)_d$, and the change rate (($M(O)_d-M(O)_{50})/M(O)_{50}\times100$) of the ratio of the oxygen atoms was calculated and the result thereof was shown in table 4. Further, in FIG. 4, the change rate (($M(O)_d-M(O)_{50})/MO)_{50}\times100$) at each depth position was plotted by using ▲.

TABLE 3

| | Example 1 | | Comparative Example 1 | |
|---|---|---|---|---|
| Depth (nm) | M(Si)d (at %) | (M(Si)d − M(Si)$_{50}$)/ M(Si)$_{50}$ × 10 (%) | M(Si)d (at %) | (M(Si)d − M(Si)$_{50}$)/ M(Si)$_{50}$ × 10 (%) |
| 50 | 39.5 | 0.0 | 34.3 | 0.0 |
| 150 | 39.7 | 0.5 | 38.3 | 5.7 |
| 250 | 37.6 | −5.0 | 37.0 | 7.8 |
| 350 | 38.6 | −2.4 | 37.7 | 9.8 |
| 450 | 39.0 | −1.2 | 37.6 | 9.6 |
| 550 | 38.5 | −2.5 | 38.1 | 11.0 |
| 650 | 38.3 | −3.0 | 38.0 | 10.7 |

TABLE 3-continued

|  | Example 1 | | Comparative Example 1 | |
| --- | --- | --- | --- | --- |
| Depth (nm) | M(Si)d (at %) | (M(Si)d − M(Si)$_{50}$)/ M(Si)$_{50}$ × 10 (%) | M(Si)d (at %) | (M(Si)d − M(Si)$_{50}$)/ M(Si)$_{50}$ × 10 (%) |
| 750 | 38.4 | −2.8 | 37.5 | 9.3 |
| 850 | 38.9 | −1.6 | 38.1 | 10.9 |
| 950 | 37.9 | −4.0 | 38.2 | 11.2 |
| 1050 | 38.6 | −2.4 | 38.3 | 11.6 |
| 1150 | 38.6 | −2.4 | 39.0 | 13.6 |
| 1250 | 37.7 | −4.5 | 37.8 | 10.1 |
| 1350 | 39.0 | −1.3 | 38.6 | 12.4 |
| 1450 | 37.3 | −5.6 | 38.5 | 12.3 |
| 1550 | 37.3 | −5.8 | 38.7 | 12.8 |
| 1650 | 37.8 | −4.3 | 39.4 | 14.8 |
| 1750 | 37.7 | −4.6 | 38.1 | 11.1 |
| 1850 | 38.5 | −2.6 | 37.8 | 10.1 |
| 1950 | 37.8 | −4.3 | 38.7 | 12.8 |

TABLE 4

|  | Example 1 | | Comparative Example 1 | |
| --- | --- | --- | --- | --- |
| Depth (nm) | M(O)d (%) | (M(O)d − M(O)$_{50}$)/ M(O)$_{50}$ × 100 (%) | M(O)d (at %) | (M(O)d − M(O)$_{50}$)/ M(O)$_{50}$ × 100 (%) |
| 50 | 6.1 | 0.0 | 5.7 | 0.0 |
| 150 | 5.0 | −17.3 | 2.9 | −49.8 |
| 250 | 6.7 | 11.0 | 3.5 | −38.9 |
| 350 | 5.8 | −4.6 | 1.9 | −67.3 |
| 450 | 6.2 | 1.8 | 2.9 | −49.6 |
| 550 | 5.9 | −3.5 | 2.8 | −51.4 |
| 650 | 6.2 | 2.5 | 3.4 | −40.7 |
| 750 | 8.9 | 13.2 | 2.7 | −53.3 |
| 850 | 6.6 | 8.4 | 3.0 | −47.0 |
| 950 | 7.1 | 17.5 | 2.8 | −50.9 |
| 1050 | 5.9 | −2.3 | 3.1 | −44.7 |
| 1150 | 6.7 | 10.4 | 2.8 | −50.7 |
| 1250 | 5.6 | −8.4 | 2.4 | −57.6 |
| 1350 | 6.1 | 1.0 | 3.4 | −40.5 |
| 1450 | 7.6 | 24.7 | 3.8 | −33.1 |
| 1550 | 7.1 | 17.3 | 2.2 | −50.7 |
| 1550 | 8.8 | 11.9 | 3.0 | −47.0 |
| 1750 | 7.8 | 28.3 | 3.9 | −31.2 |
| 1850 | 6.8 | 8.7 | 3.7 | −35.7 |
| 1950 | 6.4 | 5.4 | 3.0 | −47.5 |

Comparative Example 1

Each raw material of SrCO$_3$(3N), Al$_2$O$_3$(3N), AlN(3N), Si$_3$N$_4$(3N), and Eu$_2$O$_3$(3N) was mixed under a condition of more Si$_3$N$_4$ than that of the example 1, so that the molar ratio becomes Sr:Al:Si:Eu=0.950:0.9:6.5:0.050. The mixed raw materials were put in the BN crucible, and were set in the furnace in a state of not covering the BN crucible, and after vacuumizing the inside of the furnace and replacing the atmosphere with nitrogen, the temperature was increased up to 1600° C. at 15° C./min and the raw materials were retained and fired at 1600° C. for 3 hours under the in-furnace pressure of 0.05 MPa in the circulating nitrogen atmosphere (in the flow state of 20.0 L/min). Thereafter, the temperature was cooled from 1600° C. to 50° C. for 1 hour and 30 minutes, then the fired sample was taken out once and was pulverized and mixed in the mortar. Then, the fired sample was put in the BN crucible again, and was set in the furnace in the state of not covering the BN crucible, and after vacuumizing the inside of the furnace and the atmosphere was replaced with nitrogen, the temperature was increased up to 1800° C. at 15° C./min and the raw materials were retained and fired at 1800° C. for 3 hours, under the in-furnace pressure of 0.05 MPa in the circulating nitrogen atmosphere (in the flow state of 20.0 L/min). Then, the temperature was cooled from 1800° C. to 50° C. for 1 hour and 30 minutes, and the firing was completed. Thereafter, the fired sample was pulverized by using the mortar up to a suitable particle size in the atmospheric air, and the phosphor sample of the comparative example 1 was obtained.

The result of the composition analysis of the obtained phosphor sample is shown in table 1. As a result of the composition analysis, it was found that the phosphor had the composition close to the composition of the phosphor expressed by SrAl$_{0.8}$Si$_{5.2}$O$_{1.8}$N$_{7.2}$:EU, which was the case of x=0.8 in the composition formula SrAl$_x$Si$_{6-x}$O$_{1+x}$N$_{8-x}$:Eu However, the result was that the decrease of the oxygen content was remarkable compared with the phosphor manufactured in the example 1, and the nitrogen content was increased. This is because the oxygen is excessively separated, because the raw materials are not fired, with the BN crucible covered, as described in the example 1. Therefore, it was found that the phosphor manufactured in the comparative example 1 was the phosphor with less content of oxygen than the phosphor expressed by SrAl$_{0.8}$Si$_{5.2}$O$_{1.8}$N$_{7.2}$:Eu in the case of x=0.8 in the composition formula SrAl$_x$Si$_{6-x}$O$_{1+x}$N$_{8-x}$:Eu.

In the same way as the example 1, the obtained phosphor sample was irradiated with the monochromatic light of 405 nm and the emission intensity was measured. The measurement result is shown in table 2.

Regarding the obtained phosphor sample, in order to examine the distribution state of atoms in the particle, the change rate of the Si atoms and the oxygen atoms, with respect to the total numbers of atoms from the surface of the particle toward depth of the particle, was examined by ESCA. Measurement was performed by the same method as the case of the example 1, at 100 nm depth interval from the surface of the particle up to the position of depth 1950 nm from the position of depth 50 nm, and the ratio (at %) of each atom to the total numbers of atoms was measured at each depth position.

The ratio of the Si atoms to the total numbers of atoms at each depth position is shown in table 3. Also, the ratio of the Si atoms at the position of depth 50 nm is expressed by M(Si)$_{50}$, and the ratio of the Si atoms at the position of depth dnm is expressed by M(Si)$_d$, and the change rate ((M(Si)$_d$−M(Si)$_{50}$)/M(Si)$_{50}$×100) was calculated, and the result thereof was shown in table 3. Further, in FIG. 3, the change rate ((M(Si)$_d$−M(Si)$_{50}$)/M(Si)$_{50}$×100) was plotted by using ◇.

In addition, the ratio of the oxygen atoms to the total numbers to atoms at each depth position is shown in table 4. Also, the ratio of the oxygen atoms at the position of depth 50 nm is expressed by M(O)$_{50}$, and the ratio of the oxygen atoms at the position of depth dnm was expressed by M(O)$_d$, and the change rate ((M(O)$_d$−M(O)$_{50}$)/M(O)$_{50}$×100) of the ratio of the oxygen atoms was calculated, and the result thereof was shown in table 4. Further, in FIG. 4, the change rate ((M(O)$_d$−M(O)$_{50}$)/M(O)$_{50}$×100) of the ratio of the oxygen atoms at each depth position was plotted by using △.

(Consideration Regarding Difference Between the Example and the Comparative Example)

As is clarified from the table 2, the result was that the phosphor of the example 1 has 32% higher emission intensity than the phosphor of the comparative example. Regarding the reason therefore, consideration is given as follows.

Figure 3:
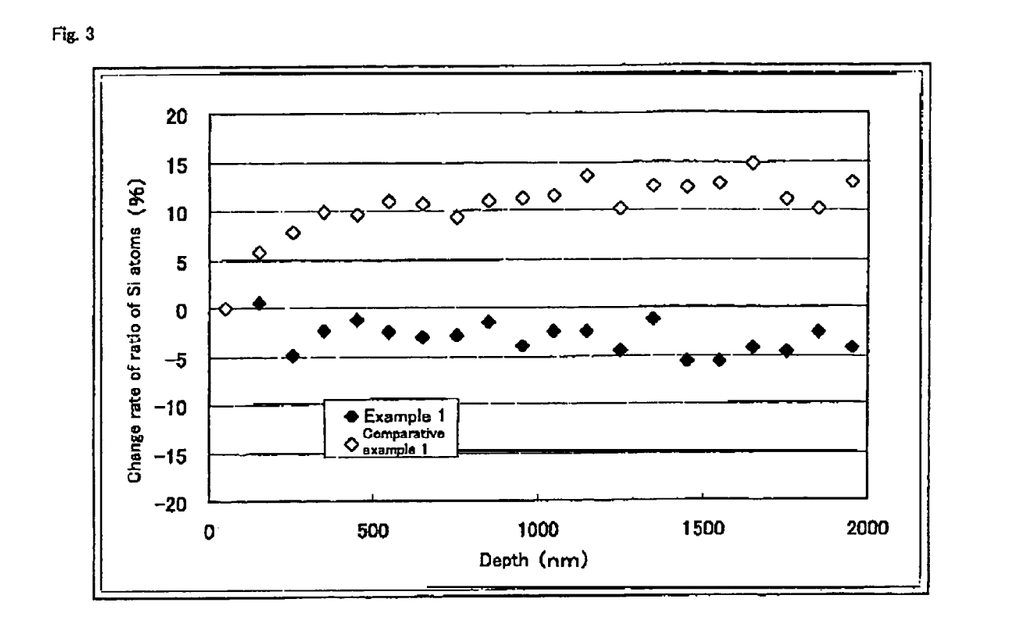
FIG. 3 is a graph illustrating a change rate of a ratio of Si atoms to the total numbers of atoms in a phosphor of an example 1 and a comparative example 1.

As is clarified from the table 3 and FIG. 3, in the phosphor of the example 1, the ratio of the Si atoms is not substantially changed at any depth position from the surface of the particle up to 2000 nm, and regarding the ratio of the Si atoms at depth 50 nm from the surface of the particle, its change rate is within 6%. Meanwhile, in the phosphor of the comparative example 1, the result is that the ratio of the Si atoms is increased as the position from the surface of the particle is deeper, and the ratio of the Si atoms is increased by 5% at the position of depth 50 nm, and further it is increased by about 10 to 15% at the position from the depth 350 nm. From this result, it is found that in the phosphor of the comparative example 1, the distribution of the Si atoms is considerably changed in the particle, and the change rate is large particularly in the vicinity of the surface of the particle. It appears that the deviation of the composition of inside the particle is caused by the change of the content of the Si atoms in the vicinity of the surface of the particle, and accordingly the crystal defect/crystal strain and the impurity phase are generated, and the deterioration of the emission intensity is caused. It is considered that in the phosphor, the surface of the particle particularly contributes to light emission, and therefore a large influence on the emission intensity is estimated.

Figure 4:
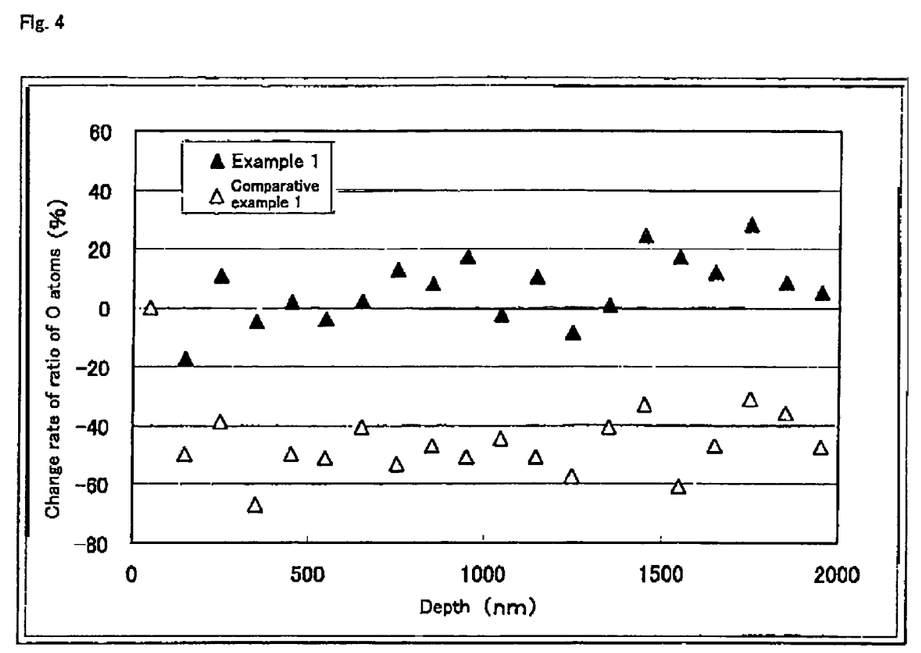
FIG. 4 is a graph illustrating a change rate of the ratio of oxygen atoms to the total numbers of atoms in a depth of 50 nm from a particle surface of the phosphor of the example 1 and the comparative example 1.

Also, as is clarified from the table 4 and FIG. 4, in the phosphor of the example 1, although the ratio of the oxygen atoms is fluctuated at the depth position from the surface of the particle up to 2000 nm, its change rate is about 20%. Meanwhile, in the phosphor of the comparative example 1, the result is that the ratio of the oxygen atoms at the position of depth 150 nm from the surface of the particle is lower by 50% than the ratio of the oxygen atoms at the position of depth 50 nm, and it is lower by 40 to 60% at the position of further deeper part. From this result, it is found that in the phosphor of the comparative example 1, the distribution of the oxygen atoms inside of the particle is considerably changed, and the change rate is large particularly in the vicinity of the surface of the particle. It appears that the deviation of the composition inside of the particle is caused by the change of the content of the oxygen atoms in the vicinity of the surface of the particle, and accordingly the crystal defect/crystal strain and the impurity phase are generated, and the deterioration of the emission intensity is thereby caused. In the phosphor, it is considered that the surface of the particle particularly contributes to the light emission, and therefore a large influence on the emission intensity is considered by the aforementioned mechanism.

BRIEF DESCRIPTION OF THE DRAWINGS

FIG. 6(A) is a perspective view, and FIG. 6(B) is a sectional view.

DESCRIPTION OF SIGNS AND NUMERALS

1 Mixture
2 Light emitting element
3 Lead frame
4 Resin
5 Container
8 Reflection surface
9 Transparent mold material
10 Container (lid)
11 Crucible
14 Firing furnace

The invention claimed is:

1. A phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency containing at least Si, O is oxygen, N is nitrogen, and element Z is one or more kind of activating agent, satisfying m>0, a>0, b>0, o≧0, and n>0), wherein
when the ratio of element B atoms to total numbers of atoms in a depth of 50 nm from a particle surface is set at $M(B)_{50}$ at %, and the ratio of the element B atoms to the total numbers of atoms in a depth of d nm which is obtained by measuring a range of the depth from 50 nm to 1950 nm from the particle surface by an interval of 100 nm is set at $M(B)_d$ at %, a value of $M(B)_d$ obtained by measuring the range of the depth from 50 nm to 1950 nm from the particle surface at a prescribed interval satisfies:

$$-10 < (M(B)_d - M(B)_{50})/M(B)_{50} \times 100 < 10,$$

expressions of 5.0<(a+b)/m<9.0, 0≦a/m<2.0, 0≦o<n, and n=(2/3)m+a+(4/3)b−(2/3) o, are satisfied, and
a peak wavelength of an emission spectrum is in a range from 400 nm to 500 nm, under excitation of light in a wavelength range from 250 nm to 430 nm.

2. A phosphor given by a general composition formula expressed by MmAaBbOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), wherein
when the ratio of oxygen atoms to the total numbers of atoms in a depth of 50 nm is set at $M(O)_{50}$ at %, and the ratio of the oxygen atoms to the total numbers of atoms in a depth of d nm which is obtained by measuring a range of a depth from 50 nm to 1950 nm from the particle surface by an interval of 100 nm is set at $M(O)_d$ at %, a value of $M(O)_d$ obtained by measuring the range of the depth from 50 nm to 1950 nm from the particle surface satisfies:

$$-40 < (M(O)_d - M(O)_{50})/M(O)_{50} \times 100 < 40,$$

expressions of 5.0<(a+b)/m<9.0, 0≦a/m<2.0, 0≦o<n, and n=(2/3)m+a+(4/3)b−(2/3) o, are satisfied, and
a peak wavelength of an emission spectrum is in a range from 400 nm to 500 nm, under excitation of light in a wavelength range from 250 nm to 430 nm.

3. A phosphor given by a general composition formula expressed by MmAaBhOoNn:Z, (wherein element M is one or more kinds of elements having bivalent valency, element A is one or more kinds of elements having tervalent valency, element B is one or more kinds of elements having tetravalent valency, O is oxygen, N is nitrogen, and element Z is one or more kind of activating agent, satisfying m>0, a>0, b>0, o≧0, and n>0), wherein when the ratio of element B atoms to the total numbers of atoms in a depth of 50 nm from a particle surface and the ratio of oxygen atoms to the total numbers of atoms in a depth of 50 nm from a particle surface is respectively set at $M(B)_{50}$ at %, and $M(O)_{50}$ at %, and the ratio of the element B atoms to the total numbers of atoms in a depth of d nm which is obtained by measuring a range from depth 50 nm to 1950 nm from the particle surface at an interval of 100 nm is set at $M(B)_d$ at %, and the ratio of the oxygen atoms to the total numbers of atoms in a depth of d nm which is obtained by measuring a range from depth 50 nm to 1950 nm from the particle surface at an interval of 100 nm is set at $M(O)_d$ at %, values of $M(B)_d$ and $M(O)_d$ obtained by measuring the range of the depth from 50 nm to 1950 nm from the particle surface at a prescribed interval satisfy:

$-10 < (M(B)_d - M(B)_{50})/M(B)_{50} \times 100 < 10$, and $-40 < (M(O)_d - M(O)_{50})/M(O)_{50} \times 100 < 40$, expressions of $5.0 < (a+b)/m < 9.0$, $0 \leq a/m < 2.0$, $0 \leq o < n$, and $n = (2/3)m + a + (4/3)b - (2/3)o$, are satisfied, and a peak wavelength of an emission spectrum is in a range from 400 nm to 500 nm, under excitation of light in a wavelength range from 250 nm to 430 nm.

4. The phosphor according to claim 1, satisfying $0 \leq a/m \leq 2.0$, $4.0 \leq b/m \leq 8.0$, $6.0 \leq (a+b)/m \leq 8.0$, $0 < o/m \leq 3.0$.

5. The phosphor according to claim 1, satisfying $a = x \times m$, $b = (6-x) \times m$, $o = (1+x) \times m$, $n = (8-x) \times m$ when satisfying $0 < x \leq 2$.

6. The phosphor according to claim 1, wherein the element M is one or more kinds of elements selected from a group consisting of Mg, Ca, Sr, Ba, Zn, and rare earth elements having bivalent valency, the element A is one or more kinds of elements selected from a group consisting of B, Al, Ga, In, Tl, Y, Sc, P, As, Sb, and Bi, the element B is one or more kinds of elements selected from a group consisting of Si, Ge, Sn, Ti, Hf. Mo, W, Cr, Pb, Zr, and the element Z is one or more kinds of elements selected from a group consisting of rare earth elements and transitional metal elements.

7. The phosphor according to claim 1, wherein the element M is one or more kinds of elements selected from the group consisting of Mg, Ca, Sr, Ba, and Zn, the element A is one or more kinds of elements selected from the group consisting of Al, Ga, and In, the element B is Si and/or Ge, and the element Z is one or more kinds of elements selected from the group consisting of Eu, Ce, Pr, Tb, Yb, and Mn.

8. The phosphor according to claim 1, wherein the element M is Sr the element A is Al, the element B is Si, and the element Z is Eu.

9. The phosphor according to claim 1, wherein when the phosphor is given by a general composition formula expressed by $M_m A_a B_b O_o N_n : Z_z$, a value of $z/(m+z)$, being a molar ratio of the element M and the element Z, is 0.0001 or more and 0.5 or less.

10. The phosphor according to claim 1, wherein a primary particle of a particle size of 50 μm or less and an aggregate, in which primary particles are aggregated, are included, and an average particle size (D50) of phosphor powders including the primary particle and the aggregate of the primary particles is 1.0 μm or more and 50 μm or less.

11. A manufacturing method of the phosphor according to claim 1, including the steps of:
    weighing and mixing raw material powders of the phosphor to obtain a mixture;
    firing the mixture put in a crucible made of a nitride material with the crucible covered in a firing furnace to obtain a fired material; and
    pulverizing the fired material to obtain a phosphor,
    wherein any one of inert gas, ammonia, mixed gas of the ammonia and the nitrogen, or the mixed gas of the nitrogen and hydrogen is used in the step of obtaining the fired material by firing the mixture,
    the firing steps are performed twice, and pulverization mixture of the fired mixture is performed between the first firing step and the second firing step.

12. The manufacturing method of the phosphor according to claim 11, wherein gas containing 80% or more nitrogen gas is used as an atmosphere gas in the firing furnace.

13. The manufacturing method of the phosphor according to claim 11, wherein firing is performed while circulating 0.1 ml/min or more atmosphere gas in the firing furnace in the step of obtaining the fired material by firing the mixture in the firing furnace.

14. The manufacturing method of the phosphor according to claim 11, wherein inside of the firing furnace is set in a pressurizing state, with the atmosphere gas set at 0.001 MPa or more and 1.0 MPa or less in the step of obtaining the fired material by firing the mixture in the firing furnace.

15. A phosphor sheet, wherein the phosphor according to claim 1 is dispersed in resin or glass.

16. A light emission device, having the phosphor according to claim 1, and a light emission part for emitting light of a first wavelength, wherein a part or the whole part of the light of the first wavelength is set as an excitation light, so that the light of a different wavelength from the first wavelength is emitted from the phosphor.

17. The light emission device according to claim 16, wherein the first wavelength is the wavelength of 250 nm to 430 nm.

18. The light emission device according to claim 16, wherein the light emission part emitting the first wavelength is an LED.

* * * * *